J. A. HARDEL.
APPARATUS FOR CEMENTING WELLS.
APPLICATION FILED FEB. 10, 1919.
1,330,023.
Patented Feb. 3, 1920.
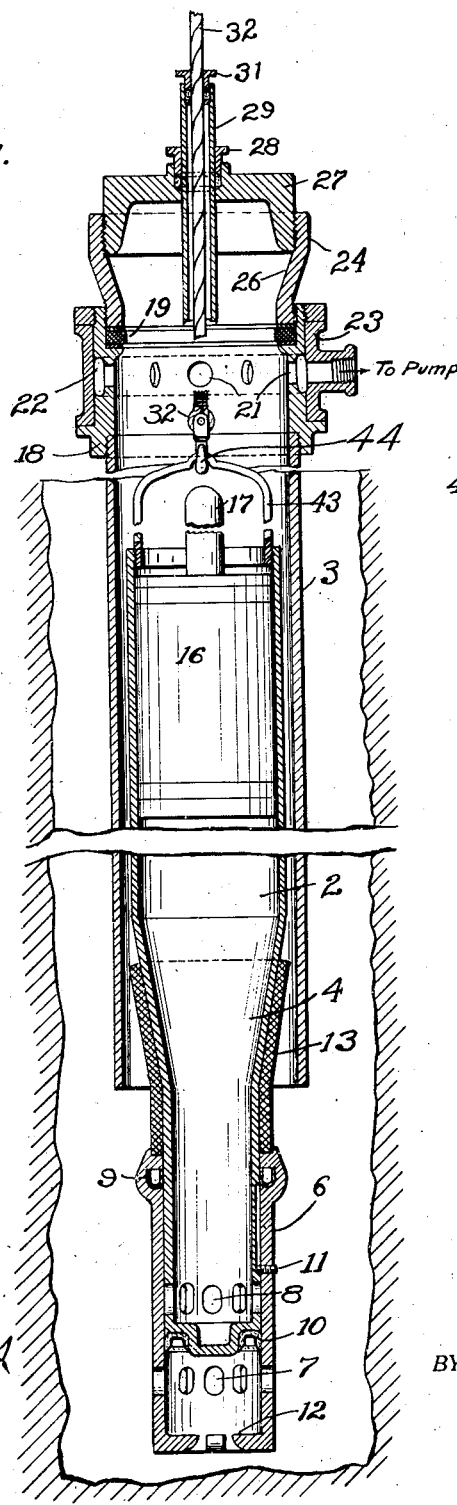
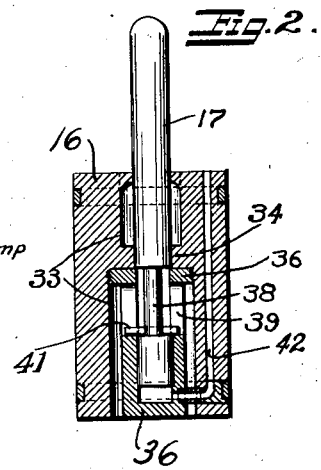
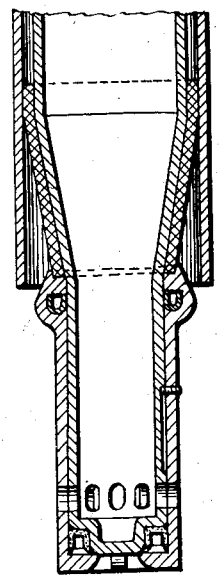
WITNESS
G. S. Evans
INVENTOR
Jean Amedée Hardel
BY White & Prost
his ATTORNEYS

UNITED STATES PATENT OFFICE.

JEAN AMEDÉE HARDEL, OF PARIS, FRANCE.

APPARATUS FOR CEMENTING WELLS.

1,330,023.  Specification of Letters Patent.  Patented Feb. 3, 1920.

Application filed February 10, 1919. Serial No. 275,963.

*To all whom it may concern:*

Be it known that I, JEAN AMEDÉE HARDEL, a citizen of the Republic of France, and a resident of the city of Paris, France, have invented certain new and useful Improvements in Apparatus for Cementing Wells, of which the following is a specification.

My invention relates to apparatus for cementing wells, and especially oil wells.

An object of the invention is to provide means for placing cement in an oil well between the wall of the well and the casing for the purpose of shutting off the flow of water into the well.

Another object of the invention is to provide means for applying cement of the desired consistency directly at the point desired without opportunity for it to be thinned or disseminated by premature contact with the water in the well.

The invention possesses other features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to the drawings:

Figure 1 is a vertical sectional view of the apparatus of my invention showing it in position in a well and casing.

Fig. 2 is a vertical sectional view of a portion of the mechanism.

Fig. 3 is a vertical section of the lower portion of the well casing and the container showing the latter in position for ejecting the cement.

The usual methods of shutting off water in a well by cementing are the Perkins patent method; the tubing method in which the cement is pumped in the bottom of the well through a string of tubing; dump bailer method in which the cement is conveyed to the bottom of the well in a so-called dump bailer, which allows the cement to escape at the time when it is pulled.

None of these processes are completely satisfactory. In certain of them in which the cement is injected in a very thin paste, it settles irregularly around the casing before setting. The water surrounding the casing being always somewhat muddy even after washing the well with clean water, the gravity of the cement paste is not much higher than the gravity of the muddy water, with the result that the muddy water is not displaced in narrow parts between casing and well wall. If, in the formations surrounding the casing, there is some alkali water not completely mudded, this water mixes with a thin paste of cement and interferes with the setting.

Another inconvenience with certain of the prior methods is the displacement of a great volume of water between the walls and the casing, which may result in caving of the walls. Furthermore the cement injected through the casing is always more or less mixed with the coating of mud, which remains on the inside walls of the casing, even after the lower plug has swept the walls. The length of time required for this method is also a serious objection.

With the tubing process, it takes a very long time to run the string of tubing to the bottom of a deep well and during this time the casing may be frozen by cavings. The tubing may also be frozen in the cement which may set prematurely inside the casing.

With the dump bailer process, the cement is forced upwardly around the casing by closing the top of the casing and lowering it to the bottom of the well. The volume of cement forced around the casing is thus not more than the inside volume of the casing for a length equal to the displacement. Furthermore, the volume of cement run down in a bailer is small and to run several bailers takes a long time, during which the setting may start. Also, running several bailers displaces the cement already in the bottom, mixing it with the water above it.

It is thus one of the objects of my invention to provide an apparatus for conveying a thick paste of cement to the bottom of the well in a relatively brief period and with the least possible contact with the water in the well and the least possible displacement of this water.

By my present invention, the objections above referred to are obviated.

To introduce the cement I use a very long bailer 2, constructed in the upper part of the casing 3, by assembling several joints of flush-joint pipe. The lower part of the bailer is cylindrical and of a smaller diameter than the main body, being connected thereto by a tapered portion 4. On this cylinder slides a sleeve 6 perforated with holes 7. The bottom of the bailer is closed and holes 8 are formed in the walls at a small distance above the bottom. Two leather cups 9 and 10 make tight joints between the sleeve and the bailer. A key or pin 11 prevents the sleeve from turning and from slipping off of the bailer when the bailer is pulled. When the bailer arrives at the bottom of the well, the further movement of the sleeve 6 and the rubber packing ring 13 are interrupted, the continued movement of the body of the bailer bringing the holes 8 into register with holes 7, further movement then being stopped by the lugs 12. At the same time, the tapered portion of the bailer is forced farther into the packing ring 13 causing it to wedge between the body of the bailer and the casing 3 and form a water tight packing therebetween. When the bailer is pulled, the heavy weight of the sleeve causes it to return to its first position on the bailer allowing the packing ring to slide down freely along the tapered portion.

After filling the bailer with cement a plunger 16 provided with a stem 17 is placed in the upper part of the bailer. On the top of the casing 3 is screwed a stuffing box 18 provided with a packing ring 19, adapted to engage the outside of the bailer. In order to provide a rotatable connection between a pump (not shown) and the interior of the casing, the box 18 is formed with apertures 21 and an annular groove 22 about which T 23 is revolubly mounted, the lateral branch of the T being connected in any suitable manner with a pump, so that water can be forced into the casing. The upper portion of the gland 24 is tapered inside at 26 to receive slips to hold the bailer while it is being assembled in accordance with well known practice. Above the taper 26, the gland is threaded to receive a cap 27 provided with a stuffing box 28 through which a pipe 29 passes. A stuffing box 31 on the upper end of the pipe provides means for making a tight joint with the cable 32 which supports the bailer.

The plunger 16 comprises a cylindrical piston formed to provide a close working fit with the inside of the bailer and is provided with means for permitting water to pass downwardly through it when it is desired to remove it from the bailer. The plunger is formed with a passage 33 passing longitudinally through it, the size of the passage being restricted by the internal flange 34 for a short distance. In the lower part of the passage 33, a flanged thimble 36 is secured, and slidably arranged in the flange 34 and the thimble is a rod or stem 17 having a reduced portion 38 of smaller diameter than the main portion extending downwardly into the thimble. Formed in the top of the thimble are slots 39 and lugs 41 on the end of the rod 38 are engaged in the slots. A by-pass 42 connects the top of the piston with the interior of the thimble so that the water pressure on both sides of the rod 17 is equalized. The plunger is forced downwardly to eject the cement from the bailer by water pressure in the casing and bailer above the plunger and during this operation there is no tendency for the valve mechanism to open if by chance there should be a difference of pressure above and below the plunger. When it is desired to withdraw the plunger the stem is caught and pulled upwardly until the lugs 41 engage the tops of the slots, when the plunger proper moves upwardly with the stem. In this position of the parts a passage is formed between the flange 34 and the reduced portion 38 of the rod 17, the water in the bailer above the plunger, passing downwardly through this passage about the lugs 41, through the slots 39 and into the lower passage 33 whence it escapes into the bailer below the plunger. A simple valve, with a stem, would give the same general result, but the valve would be raised during the motion downward, if for any reason the pressure below the plunger should become higher than the pressure above it. With the above device the stem is not raised, even in case of difference of pressure, and no liquid can pass through this plunger before the stem is pulled.

The operation of the device is as follows:

After estimating the amount of cement to be used, the lower part of the bailer is passed through the stuffing box 18 and held by the slips in the gland 24. A second joint is then screwed on the top of this lower joint and the bailer is lowered until the top of the second joint arrives at the stuffing box, where it is held stationary by the slips. As many joints as necessary for the volume of cement to be used are thus screwed together. During this time the mud is kept in circulation to prevent freezing the casing in the well, the mud being pumped through the openings 21, the packing ring 19 preventing any leakage between the bailer and the casing.

When the bailer is fully assembled, the necessary quantity of cement mixed in a thick paste is poured into the bailer, in which there is no water, the sleeve 6 being in the lower position so that the holes 7 and 8 are out of register.

The plunger 16 is then put in the bailer above the cement and the bail 43 screwed in. The cable 32 is next secured to the bail of the bailer by means of the swivel hook 44 and the cap 27 screwed into the gland 24. The stuffing box 31 is unscrewed and the bailer is run down at the greatest speed possible considering its heavy weight. Besides a displacement equal to the volume of the bailer, very little water is displaced from the casing during the descent of the bailer, since the water below the bailer passes between it and the casing as it moves downwardly. With a rapidly moving bailer there is of course some displacement from the casing which tends to lower the level therein to a point somewhat lower than in the well, but this difference in level is not great.

When the bailer reaches the bottom, the sleeve 6 is driven upwardly registering the holes 7 and 8 and wedging the packing ring 13 between the casing and the body of the bailer. The stuffing box 31 is screwed tight and the pump connected to the T 23 forces water into the casing. The water thus driven into the casing finds no way to escape, and its pressure is exerted upon the top of the plunger 16 forcing it downwardly in the bailer and ejecting the cement from the bottom of the bailer through the registered holes and into the well about the casing where it makes the desired joint.

When the plunger 16 arrives at the bottom of the bailer the cable 32 is pulled a few feet, the pipe 29 sliding through the stuffing box 28. The body of the bailer goes up and the packing ring 13 is released, the sleeve sliding on the end of the bailer to its first position. The pressure is held during this time by the pump, in case of any leakage through the stuffing box.

The casing is then lowered and allowed to rest on the bottom of the well, the stuffing box 31 unscrewed, and the bailer pulled to the top of the well. When the bailer reaches the top of the casing, the cap 27 is unscrewed, the bailer pulled out a few feet, set in the stuffing box and held stationary again with the slips. The plunger in the bottom of the bailer is then pulled after catching its stem with a suitable fishing tool, the water passing downward through the central passages as previously explained. The surplus of cement in the bottom of the bailer is washed out before its setting has taken place.

If desired the casing may be held in a spider arranged on a rotary table in accordance with well known practice, so that it may be rotated to facilitate the spreading of the cement. Since the pipe 29 passes through a stuffing box in the cap 27, and the connection of the T 23 with the box 18 is a revoluble one, and the hook 44 is swiveled, rotation of the casing is permitted.

By using the above process of cementing, the operation is carried out in a very short time; very few special preparations being necessary. The operation can be very easily started half an hour after the time where the casing is down; the assembling of the bailer requires not more than ten minutes if the joints are already assembled by three or four in the derrick. If the well has been washed and the cement mixed during this time, two tons may then be poured in the bailer in five to ten minutes, the bailer may afterward be run to the bottom of the well with a speed of 6 feet per second, with a total displacement of about 90 feet of water if the diameter is, for instance $6\frac{1}{4}''$ in $8\frac{1}{4}''$ casing with a length of 250 feet for two tons of cement, and if the depth is 3000 feet, it reaches the bottom in 8 to 10 minutes. The cement may then be injected in 10 minutes at a plunger speed of $6''$ per second, which makes a total time of about one hour ten minutes after the landing of the casing and only 20 minutes after mixing the cement. Owing to this speed and to the fact that the cement is brought down in a bailer, the paste may be much thicker than in any other process, and there is no contact of the cement with the water in the well until its ejection from the bailer. Owing to its thickness and high gravity, the cement completely displaces the water between the casing and the walls and takes a perfect setting. It should also be observed that an alkali water, which mixes with a thin paste of cement and interferes with the setting has no effect on a thick paste.

The weight of a $6\frac{1}{4}''$ bailer carrying two tons of cement should be about 2.5 T. with the weight of water mixed with the cement the total weight should be somewhat more than five tons. Such a weight may be carried down, without difficulty, by the cable of the standard tools, the casing being lowered by the calf wheel or by the draw works hoist and the plunger fished by the sand line.

I claim:

1. An apparatus for placing cement between the wall and the casing of a well, which comprises a container adapted to be lowered into the well casing, means for sealing the space between the well casing and the container, a plunger subject to the pressure of fluid in the well casing and movable downwardly in the container under said pressure to expel the cement therefrom, together with means for supplying a pressure fluid to the casing above the plunger to displace the latter.

2. An apparatus for placing cement between the wall and the casing of a well, which comprises a container adapted to be freely lowered by gravity into the well casing, means for sealing the space between the well casing and container in the lowered position of the latter, a plunger subject to the pressure of the fluid in the well casing and movable downwardly in the container under such pressure to expel the cement therefrom, together with means for supplying a pressure fluid to the casing above the plunger to displace the latter.

3. An apparatus for placing cement between the wall and the casing of a well, which comprises a container adapted to be freely lowered by gravity into the well casing, means operative in the lowered position of the container for sealing the space between the well casing and container, a plunger subject to the pressure of fluid in the well casing and movable downwardly in the container under such pressure to expel the cement therefrom, together with means for supplying a pressure fluid to the casing above the plunger to displace the latter.

4. An apparatus for placing cement between the wall and the casing in a well, which comprises a container adapted to be freely lowered by gravity into the well casing, means automatically operative to seal the space between the well casing and container when the latter reaches its lowermost position in the casing, a plunger subject to a pressure of fluid in the well casing and movable downwardly in the container under such pressure to expel the cement therefrom, together with means for supplying a pressure fluid to the casing above the plunger to displace the latter.

5. An apparatus for placing cement between the wall and the casing of a well, which comprises a normally closed container adapted to be freely lowered by gravity into the well casing, means for sealing the space between the well casing and container in the lowered position of the latter, a plunger subject to the pressure of fluid in the well casing and movable downwardly in the container under such pressure to expel the cement therefrom, means automatically operative to open the lower end of the container when the latter reaches its lowermost position in the casing, together with means for supplying pressure fluid to the casing above the plunger to displace the latter.

6. An apparatus for placing cement about the wall of a well, comprising a normally closed container for conveying cement into the well, a plunger in said container, and means for applying pressure upon said plunger to eject the cement from said container.

7. An apparatus for placing cement about the wall of a well, comprising a normally closed container for conveying cement into the well, a plunger in said container, and means for applying fluid pressure upon said plunger to eject the cement from said container.

8. An apparatus for placing cement between the wall of a well and a casing in the well, comprising a normally closed container for conveying cement into said well, a plunger in said container for ejecting the cement therefrom, and means actuated by movement of the container for opening the container to permit the contents thereof to escape.

9. An apparatus for placing cement between the wall of a well and a casing in the well, comprising a normally closed container for conveying cement into said well, a plunger in said container for ejecting the cement therefrom, and means actuated by contact with the bottom of the well for opening the container to permit the contents thereof to escape.

10. An apparatus for placing cement between the wall of a well and a casing in the well, comprising a container normally closed for conveying cement into said well, a plunger in said container for ejecting the cement therefrom, means actuated by movement of the container for opening the container, and means for applying fluid pressure upon said plunger to eject the cement from said container.

11. An apparatus for placing cement between a well casing and the wall of the well, comprising a closed container for conveying cement into the well, means actuated by movement of the container for opening said container and effecting a tight joint between the container and the casing, and means for applying pressure upon said cement to eject it from said container.

12. An apparatus for placing cement between a well casing and the wall of the well, comprising a closed container for conveying cement into the well through said casing, a sleeve slidably arranged on the lower end of said container, both said container and said sleeve being provided with apertures adapted to be brought into register by sliding movement of the container in the sleeve, and means operated by said sliding movement of the container for packing said container in said casing.

13. An apparatus for placing cement between a well casing and the wall of the well, comprising a closed container for conveying cement into the well through said casing, a sleeve slidably arranged on the lower end of said container, both said container and said sleeve being provided with apertures adapted to be brought into register by sliding movement of the container in the sleeve, and a resilient packing ring arranged to be wedged between the container and the casing by said sliding movement of the container in said sleeve.

14. A bailer adapted for use with a well casing, comprising a container, a valve associated with said container, and means operated by the opening movement of said valve for packing the container in said casing.

15. A bailer adapted for use with a well casing, comprising a container having a tapered portion adjacent its lower end, a resilient packing ring slidably disposed upon said tapered portion, and a sleeve valve slidably arranged on said container below said packing ring and serving to operate the latter to close the space between the container and well casing upon the displacement of said sleeve.

16. In a bailer, a cylindrical casing, a plunger freely displaceable longitudinally thereof for ejecting the contents of the bailer, and means carried by said plunger and lying within the casing in the displaced position of the plunger for opening a passage through the latter to permit its withdrawal.

17. In a bailer, a cylindrical casing, a plunger freely displaceable longitudinally thereof for ejecting the contents of the bailer, and means carried by said plunger and lying within the casing in the displaced position of the plunger for opening a passage through the latter to permit its withdrawal, said means being insensible to fluid pressure on either side thereof.

18. An apparatus for placing cement about the wall of a well which comprises a normally closed container adapted to convey cement into the well, means for opening the container in its lowered position in the well, and means for forcibly ejecting the cement from said container when opened.

19. An apparatus for placing cement between the wall of a well and the casing in the well, which comprises a container adapted to convey cement to the bottom of the well through the casing, means for closing the lower end of the casing about the container, and means for forcibly ejecting the cement from the container in its lowered position.

20. An apparatus for placing cement between the wall of a well and the casing in the well, which comprises a container adapted to convey the cement to the bottom of the well through the casing, means for closing the top of the casing, means for sealing the bottom of the casing about the container, and means for forcing fluid into the casing above the container to eject the contents of the latter into the well.

In testimony whereof, I have hereunto set my hand at San Francisco, California, this 1st day of February 1919.

JEAN AMEDÉE HARDEL.

In presence of—
C. S. EVANS.